United States Patent
Watson et al.

(10) Patent No.: US 11,399,509 B2
(45) Date of Patent: Aug. 2, 2022

(54) STACKABLE MAZE FOR A SMALL ANIMAL

(71) Applicant: PetSmart Home Office, Inc., Phoenix, AZ (US)

(72) Inventors: Jeffrey Stocker Watson, Phoenix, AZ (US); Paul Tamulewicz, Glendale, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 169 days.

(21) Appl. No.: 16/567,958

(22) Filed: Sep. 11, 2019

(65) Prior Publication Data

US 2020/0100467 A1    Apr. 2, 2020

Related U.S. Application Data

(60) Provisional application No. 62/739,929, filed on Oct. 2, 2018.

(51) Int. Cl.
*A01K 15/02* (2006.01)

(52) U.S. Cl.
CPC .................................... *A01K 15/02* (2013.01)

(58) Field of Classification Search
CPC .... A01K 15/02; A01K 1/0236; A01K 1/0245; A01K 1/03; A01K 1/031; A01K 1/035
See application file for complete search history.

(56) References Cited

U.S. PATENT DOCUMENTS

| | | |
|---|---|---|
| 3,260,236 A | 7/1966 | Jones |
| 3,516,389 A | 6/1970 | Meyer |
| 3,857,364 A | 12/1974 | Miller, Jr. |
| 4,660,724 A | 4/1987 | Gaynes |
| 2004/0139922 A1* | 7/2004 | Kost ................... A01K 1/0245 119/482 |
| 2006/0000422 A1* | 1/2006 | Cheng .................. A01K 31/06 119/455 |
| 2006/0185614 A1* | 8/2006 | Van Fleet, Jr. ...... A01K 1/0245 119/496 |
| 2006/0201439 A1* | 9/2006 | Ficker .................. A01K 1/031 119/416 |
| 2006/0201440 A1* | 9/2006 | Phelan ................ A01K 1/0245 119/419 |
| 2007/0227460 A1* | 10/2007 | Lynch ................. A01K 1/0245 119/455 |
| 2010/0043720 A1* | 2/2010 | Yelverton ............ A01K 1/0245 119/496 |
| 2011/0220033 A1* | 9/2011 | Sangl .................. A01K 1/0245 119/455 |
| 2020/0178507 A1* | 6/2020 | Short ..................... A01K 63/02 |
| 2021/0051918 A1* | 2/2021 | Karlsson .............. A01K 1/0047 |

* cited by examiner

*Primary Examiner* — Trinh T Nguyen

(74) *Attorney, Agent, or Firm* — Fox Rothschild LLP

(57) ABSTRACT

A maze for a small animal habitat is provided. The maze includes a base having a floor and a plurality of sidewalls. The floor includes a plurality of slots therein. In another aspect, a plurality of dividers have a notched area on a bottom portion that are configured to be inserted into the slots. The bottom surface of the floor includes one or more feet positioned at the corner of adjoining sidewalls. Each of said feet are configured to be received in a nesting relationship into an upper portion of a lower maze at the corner of two adjoining sidewalls such that an outer face of each leg is coincident with an inner surface of each adjoining sidewall.

6 Claims, 6 Drawing Sheets

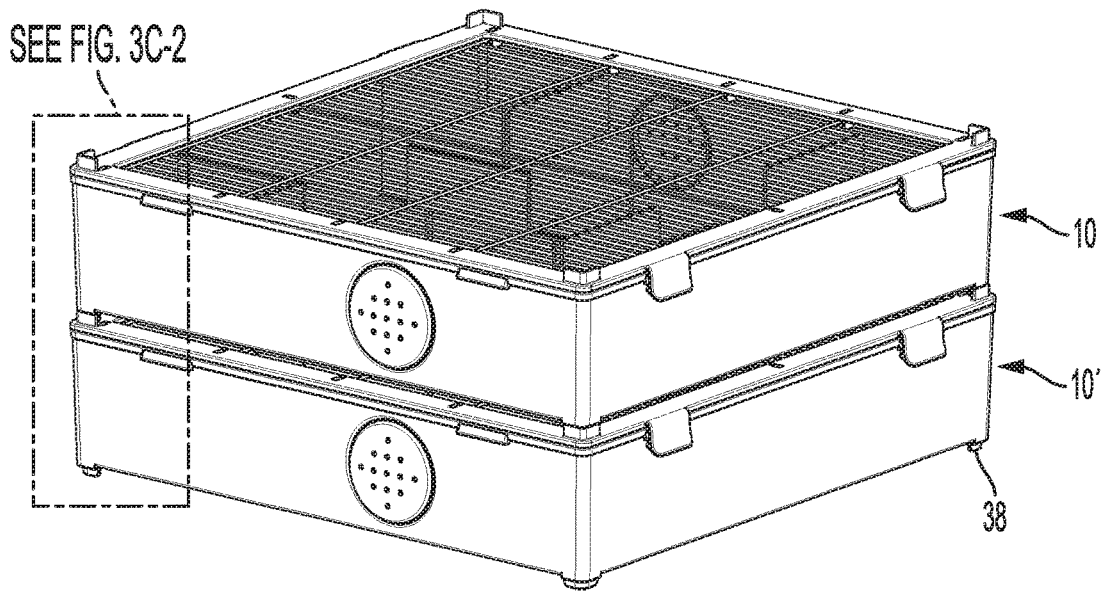
FIG. 3C-1
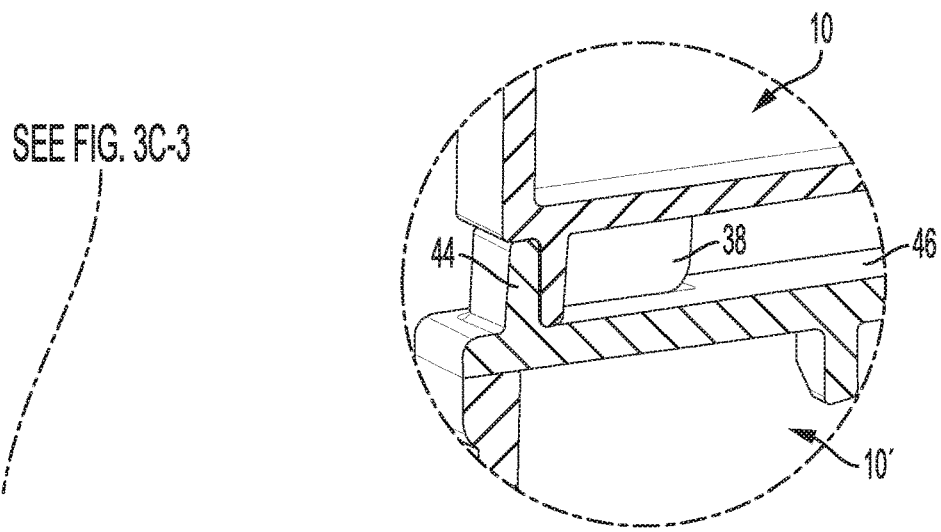
FIG. 3C-3
FIG. 3C-2
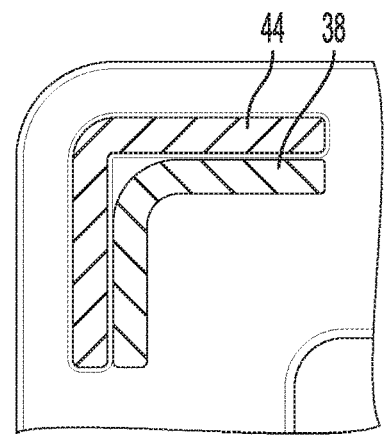
FIG. 3C-4

STACKABLE MAZE FOR A SMALL ANIMAL

RELATED APPLICATIONS AND CLAIM OF PRIORITY

This patent document claims priority to U.S. Provisional Patent Application No. 62/739,929, filed Oct. 2, 2018, the disclosure of which is fully incorporated into this document by reference.

FIELD OF THE INVENTION

This invention relates to a stackable maze for a small animal. The maze may be a stand-alone maze or may be detachably coupled to a small animal habitat.

BACKGROUND OF THE INVENTION

Small animal habitats for housing pets such as, e.g., hamsters, gerbils, mice, rats, etc. are commonly found in many settings, and in an array of sizes and configurations. Generally, these habitats include multiple wall portions, a base portion, and a top portion, with at least one of the wall portions having a wire cage and/or one or more viewing windows to allow for visibility, airflow, etc. into the interior of the habitat. In some configurations, the top portion may form (or include) a lid, thereby allowing the pet owner to access the interior of habitat for cleaning, feeding, pet removal or replacement, etc. In other configurations, at least one of the top portion and the wall portions may have a door or hatch formed therein so as to allow owner access to the interior of the habitat.

Often, a pet owner may wish to include various accessories within the habitat, such as structures for hiding or sleeping, structures for exercise (e.g., exercise wheels), etc. Some structures, such as the hiding/sleeping structures, may simply be placed within the habit in an unattached manner. Other structures, such as exercise wheels, may be coupled to an interior base or wall portion. However, regardless of if or how the accessories are coupled to habitat, the small animal is still confined within the bounds of the habitat. Additionally, because the accessories are configured for use by the small animal entirely within the bounds of the habitat, the potential for the various accessories to be decorative and/or customizable is limited. Accordingly, the invention described herein discloses devices that are intended to address the issues discussed above and/or other issues.

BRIEF SUMMARY OF THE INVENTION

In one aspect of the invention a stackable maze is disclosed. The maze may be a stand-alone maze or may be coupled to a small animal habitat as hereinafter described. The maze for a small animal habitat includes a base having a floor and a plurality of sidewalls. The floor includes a plurality of slots therein. In another aspect, a plurality of dividers have a notched area on a bottom portion that are configured to be inserted into the slots. Optionally, the sidewalls include a plurality of grooves for receiving an edge of the plurality of dividers.

In another aspect, an upper maze and a lower maze are provided. The bottom surface of each floor of the upper and lower mazes includes a substantially L-shaped foot having two legs that are approximately perpendicular to each other and of approximately equal length positioned at a corner along an intersection of the sidewalls. In another aspect, the maze includes an upper maze and a lower maze, wherein the L-shaped foot having two legs is configured to be received in a nesting relationship into an upper portion of the lower maze at an intersection of two adjoining sidewalls.

In yet another aspect, an upper maze and a lower maze having a lid are provided. Each of the lids includes a rib defining a lumen therewithin that is positioned at a corner of the lid. The bottom surface of the floor of the upper and lower mazes includes a substantially L-shaped foot with two legs that are approximately perpendicular to each other and of approximately equal length positioned at a corner along an intersection of the sidewalls. The foot of the upper maze is configured to nest in the lumen of the rib projecting from the lid of the lower maze thereby coupling the upper maze to the lower maze.

BRIEF DESCRIPTION OF THE DRAWINGS

For a better understanding of the invention, and to show how the same may be carried into effect, reference will now be made, by way of example, to the accompanying drawings, in which:

FIG. 1-2 is a detailed view of a portion of the stackable maze shown in FIG. 1-1.

FIG. 2A-1 is a perspective view of the stackable maze in accordance with the invention showing the coupling mechanism for stacking the maze.

FIG. 2A-2 is a detailed view of a portion of the stackable maze shown in FIG. 2A-1.

FIG. 2B-1 is a perspective view of the stackable maze in accordance with the invention showing the L-shaped foot for stacking the maze.

FIG. 2B-2 is a detailed view of a portion of the stackable maze shown in FIG. 2B-1.

FIG. 3A-1 is a perspective view of the stackable maze in accordance with the invention showing an alternative coupling mechanism for stacking the maze.

FIG. 3A-2 is a detailed view of a portion of the stackable maze shown in FIG. 3A-1.

FIG. 3B-1 is an exploded corner top view of two mazes being stacked together.

FIG. 3B-2 is an exploded corner bottom view of two mazes being stacked together.

FIG. 3C-1 is a perspective view of the stackable maze in accordance with an aspect of the invention.

FIG. 3C-2 is a sectional view through the feet and ribs of the top and bottom mazes of FIG. 3C-1.

FIG. 3C-3 is a detailed view of a portion of the stackable maze shown in FIG. 3C-2.

FIG. 3C-4 is a detailed top sectional view of the mated feet and ribs of the top and bottom mazes of FIG. 3C-1.

DETAILED DESCRIPTION OF THE INVENTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to." Additionally, use the term "couple," "coupled," or "coupled to" may imply that two or more elements may be directly connected or may be indirectly coupled through one or more intervening elements.

In this document, position-identifying terms such as "vertical," "horizontal," "front," "rear," "side," "top," and "bottom" are not intended to limit the invention to a particular direction or orientation, but instead are only intended to denote relative positions, or positions corresponding to directions shown when a removable hide or related component is oriented as shown in the Figures.

Figure 1:
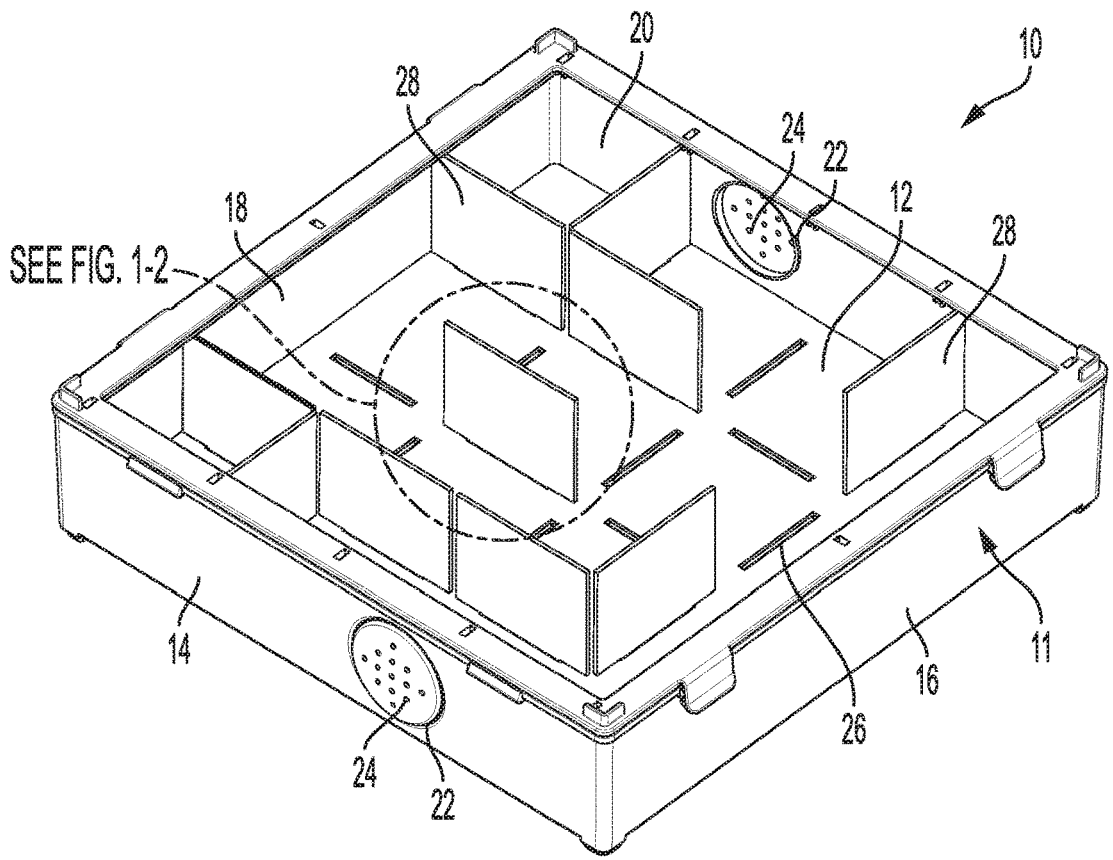
FIG. 1-1 is a perspective view of a stackable maze showing the coupling mechanism for dividers.
Figures 1, 2:
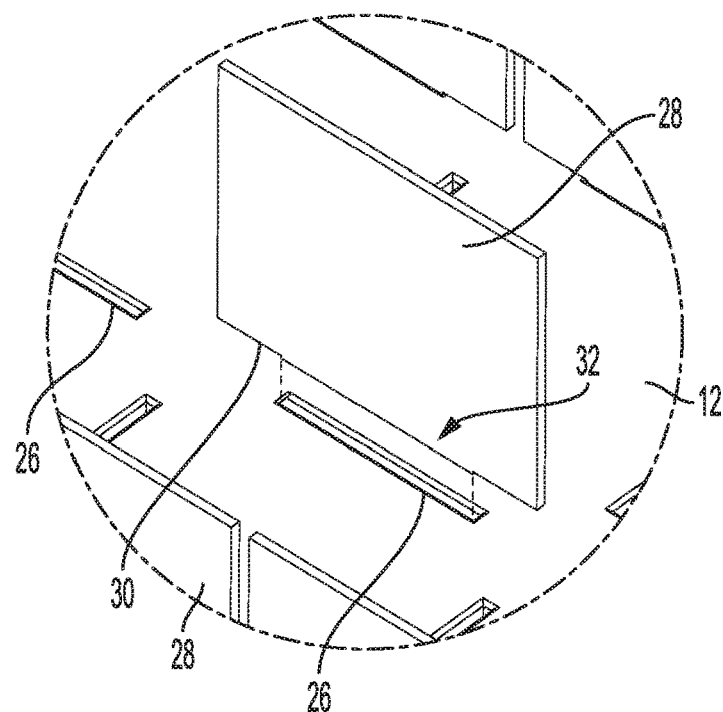

Referring now to FIGS. 1-1 and 1-2, the stackable maze 10 in accordance with the invention is shown. Stackable maze may be a stand-alone maze for a small animal or may be detachably coupled to a small animal habitat, such as a cage. The maze may be coupled to any portion of a small animal habitat that accommodates connecting ability by means of access openings 22 and tube fittings (not shown). The tube fittings serve as a conduit through which the small animal can transfer from the confines of the small animal habitat to one or more levels of the stackable maze or other accessories.

Figures 1, 3A:
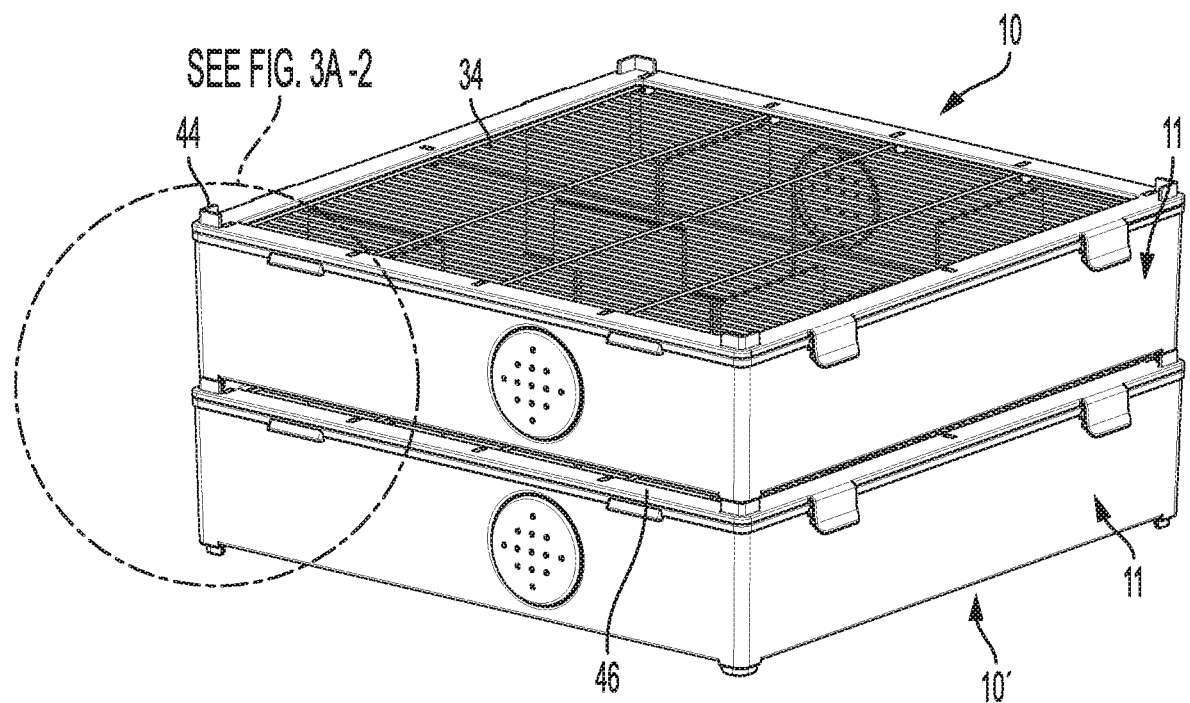
Figures 2, 3A:
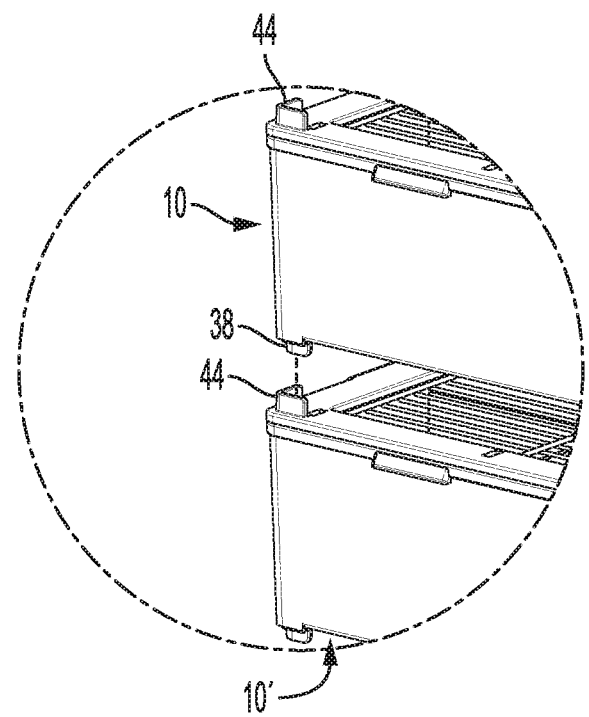
Figures 1, 3B:
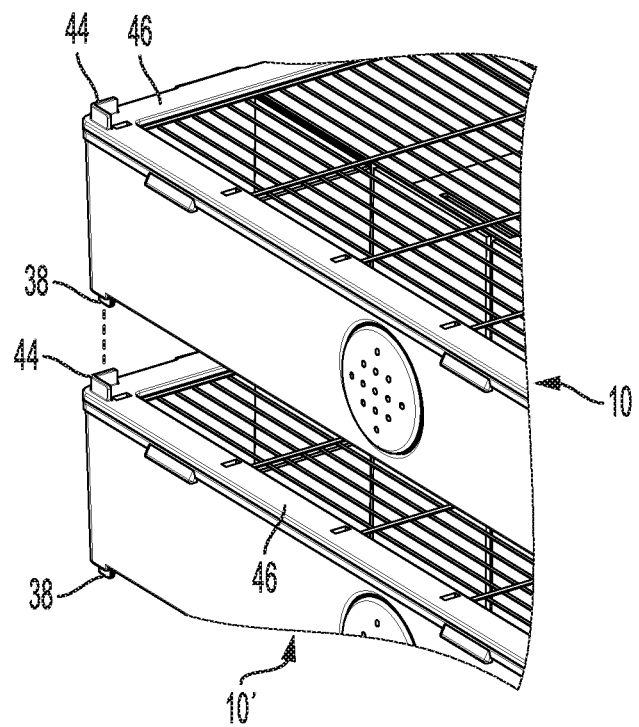
Figures 2, 3B:
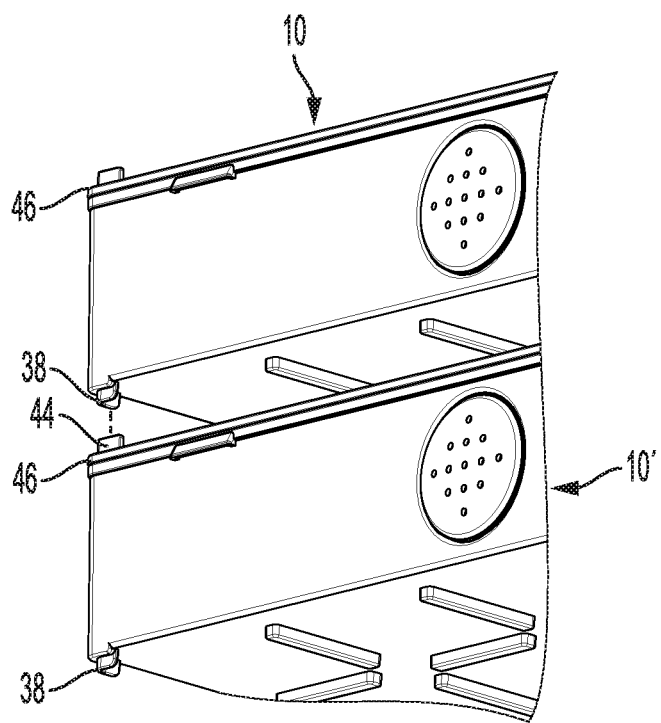

Stackable maze includes a body 11 having a floor 12, first, second, third and fourth sidewalls 14, 16, 18, 20, respectively and an optional lid 46 (as best seen in FIG. 3A-1). Maze 10 is depicted as being substantially square-shaped but those of skill in the art will appreciate that maze may have any configuration, such as circular, rectangular, or triangular, without departing from the scope of the invention. Maze 10 may also have the configuration of the shape of a lid of a small animal habitat, such as a cage, to which it may be attached. First and fourth sidewalls 14, 20 are shown as including access opening 22 with removable insert 24. When removable insert is removed, a length of tubing (not shown) that is sized to accommodate a small animal may be added from one access opening 22 to another access opening 22 in a second stackable maze 10 to couple mazes to each other at different levels and allow a small animal to navigate to different levels of the maze 10. The maze 10 may also be coupled in this way to the interior of a small animal habitat.

The floor 12 of maze 10 includes a plurality of slots 26 therein. Those of skill in the art will appreciate that slots 26 may be positioned randomly or uniformly on floor 12. Maze 10 includes a plurality of panel-like dividers 28. Each divider includes a bottom edge 30 having a notched portion 32. Notched portion 32 has a length that is equal to or slightly less that the length of slot 26. Notched portion 32 is received by and snaps or presses into slots 26. In this way, dividers can be customized and the maze pathway may be changed and reconfigured at will.

Figures 1, 2A:
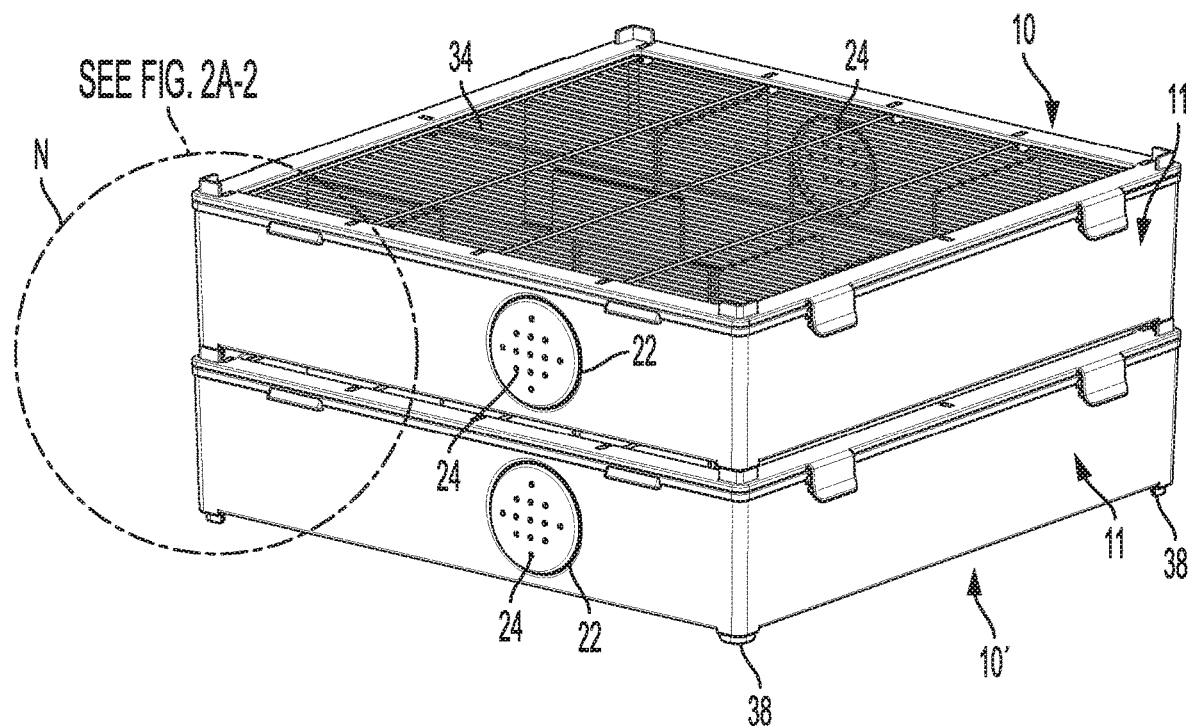
Figures 2, 2A:
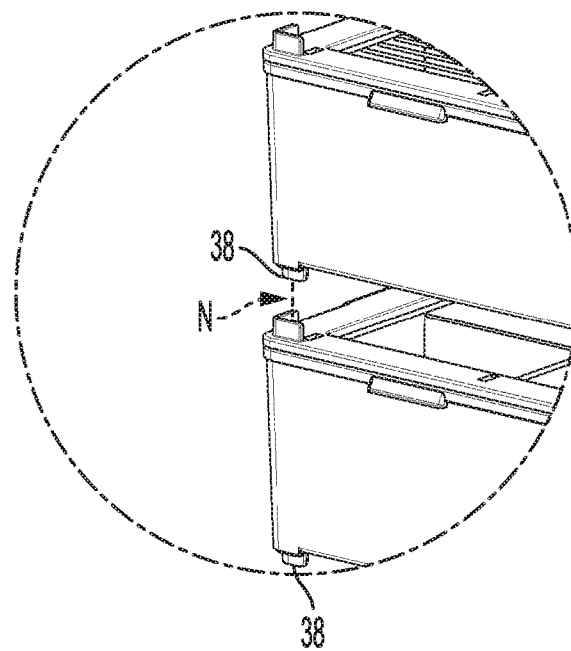

As best seen in FIG. 2A-1, each side wall 14, 16, 18, 20 (as best seen in FIG. 1-1) optionally includes a plurality of receiving grooves 34 on an inner side thereof. The plurality of receiving grooves 34 have a width that is equal to or slightly greater than a width of the edge of divider 28 (as best seen in FIG. 1-1) such that each divider may be configured to smoothly slide into a receiving groove 34, as any particular design dictates.

Referring to FIGS. 2A-1, 2A-2, 2B-1, and 2B-2, an aspect of stacking mazes 10 together is shown. A bottom surface 13 of floor 12 includes a substantially L-shaped foot 38 protruding therefrom. Each foot 38 includes two legs 39, 41 that are perpendicular to each other and of approximately equal length. Each leg has an outer face 50 and an inner face 52. Foot 38 is positioned on the bottom surface 13 of floor 12 at a corner thereof where panels 14, 16, 18, 20 intersect with and are joined to each other. In operation, when it is desired to stack an upper maze 10 to a lower maze 10', optional lid 46 (as best seen in FIG. 3A-1) of the lower maze is removed. The substantially L-shaped foot of the upper maze is positioned to nest in the intersection of two sidewalls of the lower maze 10' as seen in "N" such that the outer face 50 of each leg 39, 41 is coincident with the top portion of the inner face of each corner. The upper maze 10 fully seats on the lower maze 10' as the bottom surface 13 of the floor 12 of the upper maze 10 comes to rest on the top edge of sidewalls 14, 16, 18, 20 of the lower maze 10'.

Figures 1, 2B:
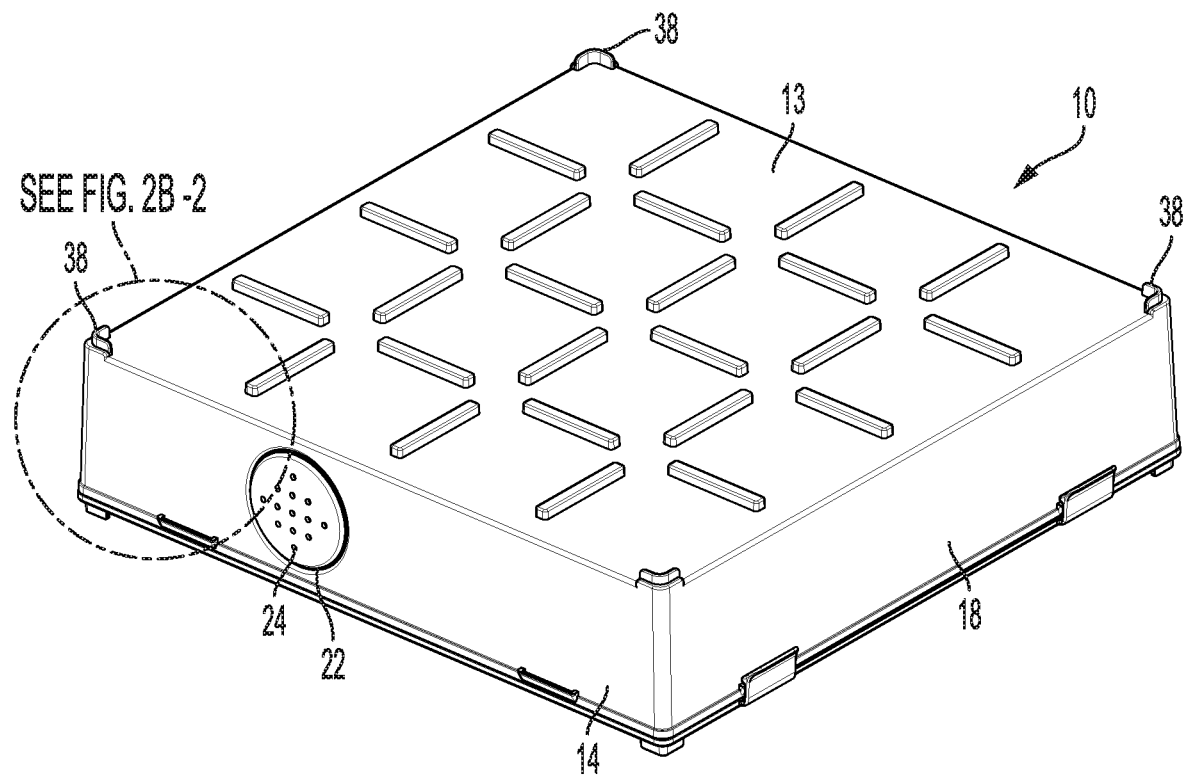
Figures 2, 2B:
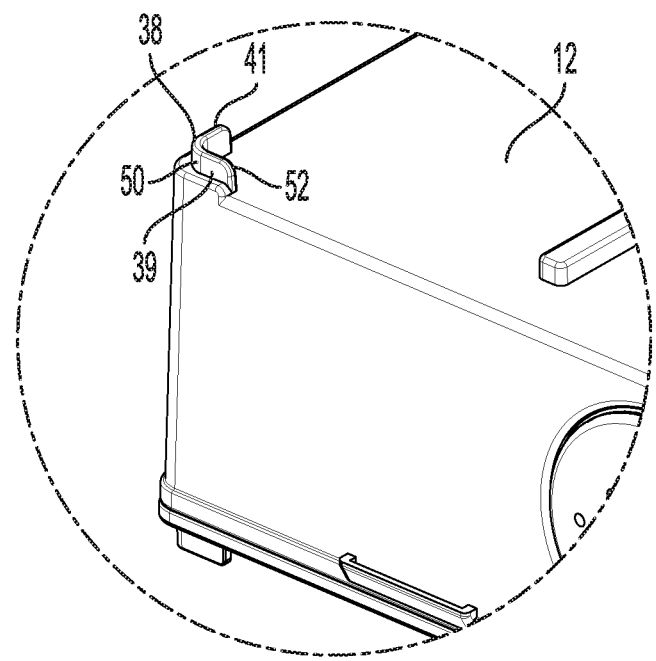

Referring now to FIGS. 3A-1, 3A-2, 3B-1, 3B-2, 3C-1, 3C-2, 3C-3, and 3C-4, another aspect of stacking two mazes 10 together is shown. In an alternative stacking mechanism, the lid 46 of the lower maze 10' is not removed. The removable inserts 24 may be removed and the access openings 22 joined by tubing sized to accommodate a small animal. A rib 44 is positioned at the corner of the lid 46 and is sized to matingly accommodate foot 38. The rib 44 projects upwardly from the top surface of the attached lid of the maze 10. When stacking an upper maze to a lower maze, each L-shaped foot of the upper maze is sized, positioned and shaped to nest within the confines of rib 44 that protrudes from the top surface of the attached lid of the lower maze. The outer face 50 (as best seen in FIG. 2B-2) of each foot 38 is coincident with the inner face of each rib 44 protruding from the top surface of the lower maze lid. The upper maze 10 fully seats on the lower maze 10' as the L-shaped feet 38 on the bottom surface 13 of the floor 12 of the upper maze 10 come to matingly rest within the confines of the ribs 44 of the lower maze lid as best seen in FIGS. 3C-1, 3C-2, 3C-3, and 3C-4.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed:

1. A maze for a small animal habitat, comprising:
   a base having a floor and a plurality of sidewalls, the floor including an upper surface having a plurality of slots therein, and a bottom surface;
   a plurality of dividers configured to be inserted into said slots;
   a lid configured to be removably coupled to the sidewalls; and
   a plurality substantially L-shaped ribs projecting respectively from each corner of the lid; wherein:

each of the slots is parallel to, and spaced apart from at least one other of the slots so that the dividers are configured to be positioned in a spaced apart, face to face relationship defining a maze pathway;

some of the slots extend in a first direction, and a remainder of the slots extend in a second direction so that each of the dividers is configured to be positioned in either of a first orientation and a second orientation in relation to the upper surface of the floor and the maze pathway is configurable with at least one turn;

each of the dividers has a notched bottom portion configured to be removably secured in a respective one of said slots by a press or snap fit so that the maze pathway can be changed and reconfigured;

the bottom surface of the floor comprises a plurality of substantially L-shaped feet projecting therefrom, said substantially L-shaped feet positioned on a corner of two adjoining sidewalls and each comprising two substantially perpendicular legs; and the maze is a first maze and said feet and said ribs are configured so that each of the feet of the first maze is received in a nesting relationship within the confines of a rib of a substantially identical second maze when the first maze is stacked on the second maze, so that the first maze is supported by the second maze by way of the lid and the ribs of the second maze.

2. The maze of claim 1 wherein said sidewalls include a plurality of grooves for receiving an edge of the plurality of dividers.

3. The maze of claim 1 wherein each substantially perpendicular leg has a substantially equal length.

4. The maze of claim 1 wherein an outer face of each substantially perpendicular leg of the first maze is coincident with an inner surface of the each rib of the lid of the second maze when the first maze is stacked on the second maze.

5. The maze of claim 4 wherein the first maze is configured to fully seat on the second maze as the bottom surface of the floor of the first maze comes to matingly rest within the confines of the ribs on the lid of the first maze when the first maze is stacked on the second maze.

6. The maze of claim 1, wherein the second direction is perpendicular to the first direction.

\* \* \* \* \*